March 10, 1964  E. R. OREAR  3,124,797
SPIRAL SCAN RADAR UTILIZING A.G.C. MODULATION
VOLTAGE FOR DERIVING TARGET POSITION
Filed June 29, 1959  2 Sheets-Sheet 2
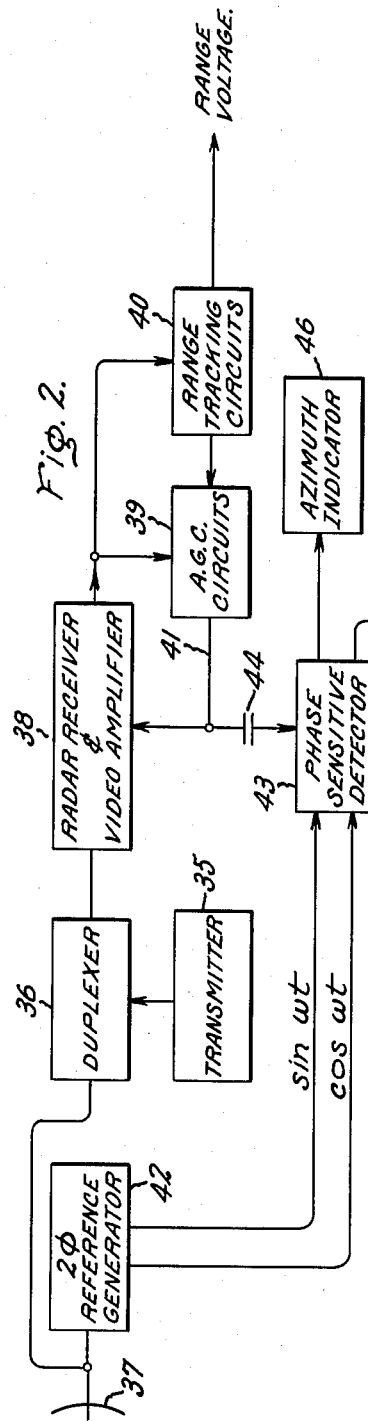
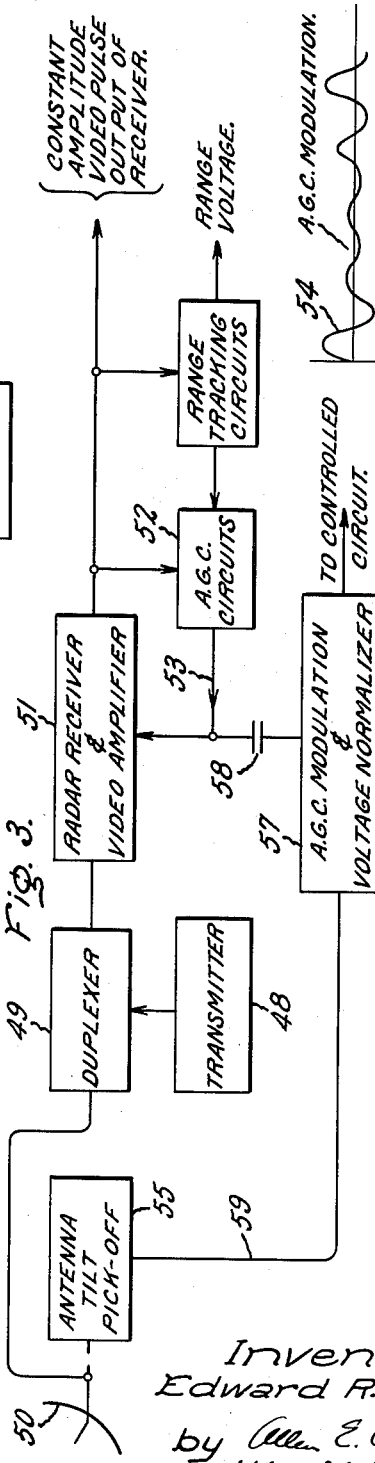
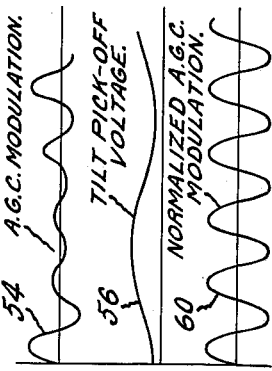
Inventor:
Edward R. Orear,
by Allen E. Amgott
His Attorney.

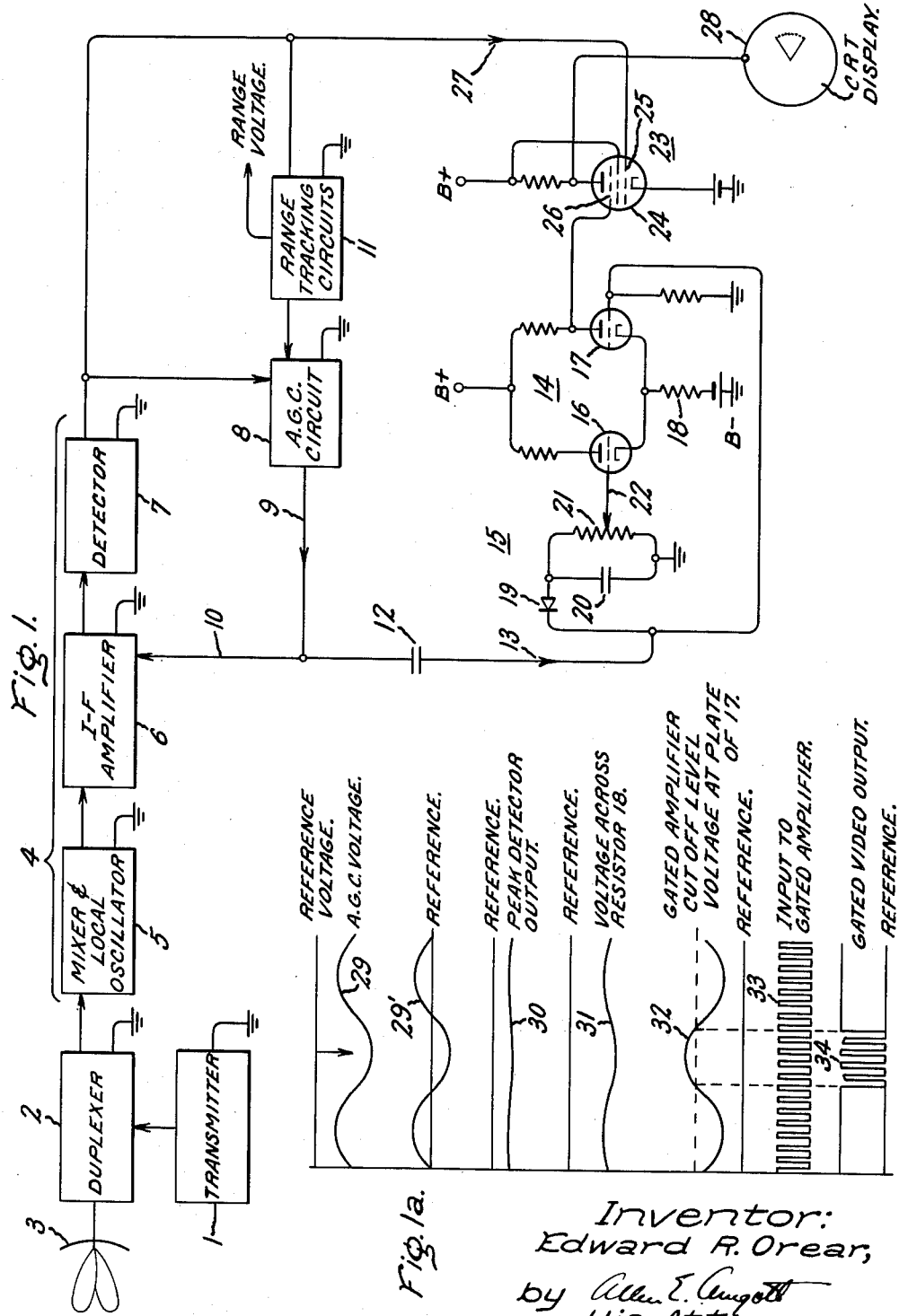

United States Patent Office 3,124,797
Patented Mar. 10, 1964

3,124,797
SPIRAL SCAN RADAR UTILIZING A.G.C. MODULATION VOLTAGE FOR DERIVING TARGET POSITION
Edward R. Orear, Whitesboro, N.Y., assignor to General Electric Company, a corporation of New York
Filed June 29, 1959, Ser. No. 823,771
8 Claims. (Cl. 343—16)

This invention relates to target detection systems and more particularly to improved means for deriving target positional information from airborne radar receivers.

Conical scan radar is commonly used in airborne vehicles to determine the position of a target. In a conical scan radar, the antenna is made to scan in such a manner that a radiation pattern having a conical configuration is developed. With this type of radiation pattern, there is only one line along which an object will return constant amplitude signals regardless of the instantaneous direction of the conically scanning beam, namely, the line coinciding with the axis of the conical pattern. Because the antenna is conically scanning, the signals received from a target which is off the axis of the conical scan pattern will vary in amplitude dependent upon the antenna position with respect to the target. Knowing the instantaneous position of the antenna, from the variation in amplitude of the received signals, the line-of-sight to the target may be derived. Conical scanning, therefore, yields information regarding both the azimuth and the elevation of the reflecting object. Also, at the same time, range data may be secured by measuring the time interval between transmission and reception of the radiated energy.

A presently existing radar system for accomplishing line-of-sight determination of an object from which steering information may be derived is one which includes automatic tracking circuitry, and a servo system to position the antenna on a target and to cause the antenna to follow the target. Steering information may be derived in such a system by pick-offs associated with the antenna to indicate the position of the antenna and, therefore, the azimuth and elevation of the target. This type of radar system requires special mechanisms to position the antenna and additional equipment to indicate the direction of the antenna with respect to a reference axis. This special equipment adds weight to the radar carrying aircraft and also requires additional space. Inasmuch as space is at a premium in aircraft and additional weight detracts from efficient performance of an aircraft, the disadvantages of a radar system of the above-mentioned type are readily apparent.

Another radar arrangement for determining the line-of-sight to a target with respect to a fixed reference axis comprises a radar system in which the axis of scan of the antenna is fixed and the position of the target is determined by the variation in amplitude of received pulses with respect to the position of the antenna. However, this system requires constant attention from the operator in order that the proper gain of the receiver be effected to obtain accurate positional information of the target. Inasmuch as the position of the target is indicated by the amplitude of the received pulses, when the target is off the scan axis but close to the radar, the received signals may reach the receiver saturation level, and the angular position of the target with respect to the fixed scanning axis cannot be obtained accurately. It then becomes necessary to reduce the overall gain of the receiver. This adjustment of the gain requires constant attention and manipulation by the aircraft operator, which is highly undesirable.

The present invention discloses means for determining target positional information which overcome the foregoing limitations of the prior art. Further, the invention does not require complex antenna positioning mechanisms to determine the antenna position with respect to a reference axis, and does not require constant attention and manipulation by the operator once a target is located. Means are provided from which information derived directly from automatic gain control (AGC) circuitry of the radar receiver is used to indicate the position of a target. Still further, means are provided to enable the invention to be employed with both conical and spiral scan radars.

Accordingly, it is an object of this invention to provide a simple and inexpensive means for deriving target positional information from a conical or spiral scan radar making use of the AGC modulation voltage.

It is another object of the invention to derive directly from the automatic gain control circuit of a radar receiver, target positional information which may be easily displayed on meters or a cathode-ray tube.

It is a further object of the invention to provide a simple and inexpensive means for obtaining target positional information from a radar receiver which is readily adaptable for application to an existing non-angle tracking radar.

It is a still further object of the invention to provide means for obtaining target positional information from an airborne radar receiver which requires but a minimum amount of space and which contributes little weight to the aircraft.

In achieving these and other objects of the invention, provision is made for utilizing the AGC modulation voltage of a radar receiver to develop target positional information. In a conical or spiral scan radar, if the amplitude of the received pulses is maintained constant by an AGC circuit, the AGC modulation voltage is approximately a sinusoidal function with time (at the antenna spin rate) and the phase of the sinusoid is related to the instantaneous position of the antenna. Therefore, the amplitude and phase of the AGC modulation voltage bear information indicative of the azimuth and elevation of a target with respect to the axis of conical scan. Circuitry is provided for developing the information contained in the AGC modulation voltage into a usable indication of the position of a target. The AGC modulation voltage is derived from the AGC circuits and applied to a controlled circuit which yields an output dependent upon the amplitude of the AGC modulation voltage with respect to time. This output is then applied to a utilization device which displays target positional information.

The features of the invention which are believed to be novel are set forth with particularity in the appended claims. The invention itself, however, both as to its organization and method of operation, together with further objects and advantages thereof, may best be understood by reference to the following descriptions when taken in connection with the following drawings:

FIGURE 1 illustrates one embodiment of the invention incorporated in a conical scan radar;
FIGURE 1a shows the voltage waveforms appearing at various points in the circuit of FIGURE 1;
FIGURE 2 illustrates a second embodiment of the invention incorporated in a conical scan radar;
FIGURE 3 illustrates the invention incorporated in a spiral scan radar; and
FIGURE 3a shows the voltage waveforms at various points in the circuit of FIGURE 3.

The present invention is applicable to both conical scan and spiral scan radar, but for purposes of illustration, a more detailed discussion of the invention is presented with its use in a conical scan radar.

In FIGURE 1 there is illustrated the invention as embodied in a conical scan radar generally comprising a transmitter 1, a duplexer 2 and an antenna 3. The antenna 3 is used for both transmission of pulsed energy and reception of reflected pulses. The duplexer 2 serves the usual function of blocking high energy transmit pulses from the receiver. The receiver 4 generally comprises a mixer and local oscillator 5, an I.-F. amplifier 6 and a detector 7. An automatic gain control (AGC) circuit 8 is connected to the output of receiver 4 and supplies a voltage back to the receiver 4, in this illustration to the I.-F. amplifier 6, over leads 9 and 10, to maintain the output pulses from detector 7 of substantially constant amplitude. The AGC circuit 8 is actuated by the range tracking circuits 11 by usual techniques. The automatic gain control circuits may take the form of that disclosed in the patent to R. L. Sink, No. 2,743,355, issued April 24, 1956 and assigned to the same assignee as the subject application. It will be recognized by those skilled in the art that range tracking circuits 11 are generally synchronized by a pulse from transmitter 1, but no such connection has been shown in the drawing.

The AGC modulation voltage is passed by a blocking capacitor 12 and is applied over lead 13 to a difference amplifier 14 and a peak detector 15 for negative peaks. The difference amplifier 14 comprises grid-controlled vacuum tubes 16 and 17 having a common cathode resistor 18. The AGC modulation voltage is applied to the difference amplifier 14 at the grid of tube 17. Peak detector 15 comprises a unidirectional conducting device 19 and a smoothing network consisting of capacitor 20 and potentiometer 21. The output of the peak detector 15 is applied to the grid of tube 16 through lead 22.

The output of difference amplifier 14 is applied to a controlled circuit 23 which may comprise a gated video amplifier 24 having a first control grid 25 and a second control grid 26. Amplifier 24 is a pentode of the sharp cut off type and is generally referred to as a "two-control-grid" tube. The constant amplitude video pulses from the detector 7 are applied over lead 27 to the grid 25 of the amplifier 24. The output of the difference amplifier 14, which is taken from the plate of tube 17, is applied to grid 26 of the video amplifier. The output signal from the controlled circuit 23 is taken from the plate of amplifier 24 and applied to a target position indicating means which is illustrated in FIGURE 1 as a cathode ray tube (C.R.T.) 28. It will be understood that the sweep of C.R.T. 28 is obtained from antenna 3 or some pick-off on the antenna, but for simplicity of illustration, no such connection has been shown.

An understanding of the operation of the invention will be best understood by reference to the various waveforms shown in FIGURE 1a taken together with a discussion of the operation of the aforementioned circuitry. When a target is detected, the AGC circuit 8 is actuated by the range tracking circuits 11 and, if the target should be off the axis of scan of the antenna, the AGC voltage will have a waveform such as shown at 29 in FIGURE 1a. This waveform is the resultant of the normal AGC voltage and a sinusoidal voltage due to the cyclic scanning of the antenna. It will be apparent that the AGC voltage will be most negative (or a maximum negative) when the antenna is pointing closest to the target and most positive (or minimum negative) when the antenna is pointing farthest from the target. The sinusoidally varying component of the AGC voltage, the AGC modulation voltage, is passed by the capacitor 12 and applied to the grid of tube 17 and peak detector 15. The waveform of the AGC modulation voltage which is varying sinusoidally at the spin rate of the antenna is shown at 29′, FIGURE 1a. The negative maximums of this AGC modulation voltage occur when the antenna is pointing closest the target. This negative half-wave of AGC modulation voltage is rectified by the unidirectional conducting device 19 of peak detector 15 and is smoothed in the RC circuit comprising capacitor 20 and potentiometer 21 which yields a signal having a waveform such as shown at 30, FIGURE 1a. The output voltage from the peak detector 15 is applied to the grid of tube 16, the magnitude of this voltage being dependent upon the amplitude of the AGC modulation voltage. This negative bias on the grid of tube 16 makes tube 16 conduct less current.

Tube 17 is rendered more conductive when a target is detected and is conductive over the full cycle of the AGC modulation voltage. The currents through tubes 16 and 17 add in common cathode resistor 18 and produce a voltage across resistor 18 whose waveform is shown at 31, FIGURE 1a. It will be apparent that the voltage at the plate of tube 17 will be of opposite phase to the voltage at the grid. The waveform of the plate voltage of tube 17 is shown at 32, FIGURE 1a. It should be noted that the AGC modulation voltage has been phase inverted; the positive peaks of the voltage appearing at the plate of tube 17 occur when the antenna is pointing closest the target. Constant amplitude video pulses 33 are applied to the grid 25 of amplifier 24 and the output of the difference amplifier is applied to grid 26 of amplifier 24. When the output of the difference amplifier reaches a predetermined amplitude, the amplifier 24 is gated "On" by the positive peaks of the AGC modulation voltage. The power supply in the cathode circuit of amplifier 24 is used to keep the second control grid 26 in the practical range of voltage outputs from the output of plate 17 of difference amplifier 14. At other than peaks of the AGC modulation wave, the gated amplifier is turned "Off," permitting no video pulses to be passed by the gated amplifier.

The use of difference amplifier 14 allows a selection on a variable time basis of the time gated amplifier 24 is to be "On." The magnitude of the output of difference amplifier 14 is dependent upon the difference in the amplified input potentials and, therefore, the greater the AGC modulation voltage, the shorter is the time the gated amplifier is turned "On." The positive going peaks of the output of the difference amplifier not only gate amplifier 24, but also control the gain. Therefore, the video pulses amplified by amplifier 24 vary in amplitude in accordance with the AGC modulation voltage. The output 34 of the gated amplifier 24 (FIGURE 1a) is applied to a target positional indicating means which, in the embodiment illustrated in FIGURE 1, comprises a C.R.T. of the radial sweep type, such as a type "I" or type "P" scope. For example, in a type I display a series of traces is generated on a cathode ray tube starting at the center of the face and sweeping radially outward in synchronism with the repetition rate of the radar. The time duration of the radial sweep is made proportional to the desired range in which the targets are to be sought. The radial position of the traces is synchronized with the spin of the antenna; and, when a target is detected in search, an arc is generated on this display which, with proper signal levels, will indicate the position of the target. For example, in the C.R.T. 28 of FIGURE 1 the trace indicates a target at the same elevation as the radar equipment but off to the right. The length of the arc is a function of the angle the target is off the conical scan axis, the less the angle off the axis the greater is the length of the arc. The range of the target is indicated by the radial distance from the center of the display to the arc. This distance is determined by the range tracking circuits 11, or read directly off the C.R.T.

When the detected target is dead ahead, all received pulses will be of equal amplitude and there will be no AGC modulation. Therefore, there is no output from the peak detector 15 and tube 17 will be conductive with a constant magnitude of current. When this condition occurs the potential at the plate of tube 17 will be at a level, which by design, is of sufficient magnitude to gate amplifier 24 On. Thus, the C.R.T. display will be a full circle.

The amplifying arrangement shown in FIGURE 1 as comprising difference amplifier 14, peak detector 15 and amplifier 24 may take several forms. In a simple case, the AGC modulation voltage 29′ and the constant amplitude pulses 33 can be combined at the grid of a video amplifier with the polarity such that the video pulses, when the antenna is pointing in a direction closest to the target, are increased in amplitude. When the antenna is pointing in a direction farthest from the target, the modulation signal will be reversed in polarity resulting in a decrease in the gain or cut-off of the video amplifier. The output of the video amplifier is connected to the grid element of the C.R.T. Since the sweep of the C.R.T. is synchronized with the position of the antenna, the display will show the correct position of the target.

This invention is also applicable for embodiment in a conical scan radar where it is desired to display the steering information on meters instead of on a cathode ray tube. Turning now to FIGURE 2, there is shown a conical scan radar system wherein the invention is utilized to indicate the position of a target on meters instead of a C.R.T. The radar comprises a transmitter 35, a duplexer 36, an antenna 37 and a radar receiver 38 having an AGC circuit 39. By well-known techniques the AGC circuit is actuated by range tracking circuits 40 when a target is detected. The AGC voltage is returned to the receiver 38 over lead 41.

A two-phase reference generator 42 is synchronized with the antenna and develops voltages sin $wt$ and cos $wt$ where $w$ is equal to the antenna radian spin rate. These two outputs of the reference generator 42, namely, sin $wt$ and cos $wt$, represent at any instant the azimuth and the elevation direction of the conically scanning antenna, and are applied to a controlled circuit 43, shown in block form as a phase sensitive detector, to which the AGC modulation voltage is also applied through a D.C. blocking capacitor 44. Said phase sensitive detector 43 is well-known in the art. The outputs of the phase sensitive detector 43 are direct current voltages having magnitudes representative of the instantaneous position of the antenna when a minimum AGC voltage component is developed in the azimuth and elevation directions. When the AGC voltage is a minimum, the antenna is pointing closest to the target.

The AGC modulation signal is combined in the phase sensitive detector 43 with the two-phase reference generator signals. The AGC modulation signal and the reference generator signals occur at the same frequency. The AGC modulation will have a varying amplitude depending on the position off the conical scan axis of the object being detected. Also, the AGC modulation will have a phase relationship to the reference generator signals, either of the same phase or different phase depending on the azimuth and elevation position of the object being detected. For example, with the sin $wt$ reference signal representing the azimuth position of the antenna, this reference signal may have its maximum positive value when the antenna conical scan is at its maximum right position.

If the object being detected is also in a right position with respect to the antenna conical scan axis, the AGC modulation will have a minimum value at that instant. The characteristic of the phase detector is such that the direct current voltage output will have a maximum output. This output will actuate the meter, 46, to indicate a deflection proportional to the angular position. Should the object of detection be at a greater angle, the magnitude of the AGC modulation will increase and the direct current voltage output will increase causing a greater deflection of meter, 46. If the object had been to the left, the deflection of meter, 46, would be in the opposite direction. Because the AGC modulation has a phase relationship of 90° to the elevation reference, cos $wt$, the part of the phase detector connected to elevation indicator, 47, will have no output and the meter, 47, will not be deflected. If the object being detected is displaced from the conical scan axis in both azimuth and elevation, then the AGC modulation will have waveform components in phase with both sin $wt$ and cos $wt$, resulting in deflection, not necessarily equal, of meters 46 and 47.

The indicators 46 and 47 will thus indicate the azimuth and the elevation by which the target varies from the axis of the conical scan. In the alternative, a combination meter responsive to both D.C. voltages may replace indicators 46 and 47. The distance to the target may be determined by usual techniques from the range voltage generated by the range tracking circuits 40.

This invention is further applicable to a spiral scan radar as shown in FIGURE 3. A spiral scan radar is so designated because the movement of the antenna traces a spiral pattern in a plane perpendicular to the axis of the radar antenna. In FIGURE 3, there is shown a radar comprising a transmitter 48 and a duplexer 49 connected to a spirally scanning antenna 50. The signals received by the antenna are applied through the duplexer 49 to the radar receiver 51. An AGC circuit 52 keeps the output pulses of the receiver 51 substantially constant by returning an AGC voltage over line 53 to the receiver 51. Since the antenna is spirally scanning, the axis of scan is not fixed as is the case with conical scan radar. Because of the movement of the axis of scan of the spirally scanning antenna, when a target is located the AGC modulation voltage will not have a constant value, as is the case with conical scan, but will have a waveform such as that shown at 54, FIGURE 3a. Therefore, compensation must be made for the variation of the AGC modulation voltage in the spiral scan radar.

To provide this compensation an antenna tilt pick-off 55 of any well-known suitable type is provided on the antenna drive to generate a voltage indicative of the deviation of the antenna axis from a reference axis of scan. This deviation voltage, also referred to as the tilt pick-off voltage, is shown at 56, FIGURE 3a. To obtain an AGC modulation voltage of constant amplitude, the AGC modulation voltage 54, which varies in value, is applied to a normalizer 57 through D.C. blocking capacitor 58. The tilt pick-off voltage generated at antenna pick-off 55 is also applied to normalizer 57 over line 59. The effect of the tilt pick-off voltage in normalizer 57 is to normalize the amplitude of the AGC modulation voltage 54. The output of normalizer 57 is a sinusoidally varying constant amplitude voltage varying in time with the antenna spin rate. In a simple form the normalizer 57 is an amplifier wherein the AGC modulation voltage is applied to a control grid and the gain of the amplifier is varied by the tilt pick-off voltage. The normalized AGC modulation voltage, having a waveform as shown at 60, FIGURE 3a, may now be utilized as explained in the discussion of FIGURE 1 or FIGURE 2.

It should now be apparent that there have been provided extremely simple circuitry for deriving positional information of an airborne object from an airborne conical or spiral scan radar, making use of the AGC modulation voltage. Further, there are provided means for deriving directly from the automatic gain control circuit of an airborne radar steering information which may easily be displayed on meters or a cathode ray tube, which makes use of inexpensive circuitry, and which is readily adaptable for application to existing non-angle tracking radars.

While there have been illustrated and discussed particular embodiments of the invention, it will be apparent that changes and modifications of the invention will become apparent to those skilled in the art. Therefore, it is desired that the invention be limited only by the bounds of the appended claims as interpreted by the prior art.

What is claimed is:

1. In an airborne conical scan radar including means for transmitting electromagnetic energy in a predetermined pattern about a reference axis, means for receiving pulses reflected from an airborne target, and an antenna common to the transmit and receive means, means to determine the line-of-sight to an airborne target with respect to a reference axis comprising:

(a) AGC means to keep substantially constant the amplitude of the output of the receiving means;

(b) means to derive from said AGC means and AGC modulation signal varying sinusoidally with the spin rate of the antenna, whereby the phase of the AGC signal is indicative of the position of the antenna with respect to the reference axis, the AGC modulation signal having an instantaneous minimum value when the antenna is pointed closest to the target;

(c) means for amplifying the output of the receiver, the AGC modulation signal being applied to said amplifying means;

(d) gating means responsive to the amplitude and phase of said AGC signal to control the duration and occurrence in time of the output signal of said amplifying means; and (e) target position indicating means, the output of said amplifying means being applied to said target position indicating means to obtain an indication of the position of the target with respect to the reference axis.

2. The airborne conical scan radar system of claim 1 wherein said target position indicating means is comprised of:

(f) a cathode ray tube of the radial sweep type having its sweep rate synchronized with the rate of spin of the antenna, the output of said amplifying means being applied to said cathode ray tube to obtain an indication of the position of the target with respect to the reference axis.

3. In a conical or spiral scan radar system including means for transmitting pulsed electromagnetic energy in a predetermined pattern about a reference axis, means for receiving pulses reflected from a target, and an antenna common to the transmit and receive means, means to determine the line-of-sight to a target with respect to a reference axis comprising:

(a) means to derive a scan signal which varies sinusoidally at the spin rate of the antenna with the phase determined by the angular position of the target relative to the antenna and has an amplitude proportional to the displacement of the target from the reference axis; and (b) output means responsive to said scan signal to provide an output signal which is modulated thereby in such a manner that its duration is proportional to the scan signal amplitude and its occurrence in time is determined by the phase of the scan signal.

4. In a conical or spiral scan radar system including means for transmitting pulsed electromagnetic energy in a predetermined pattern about a reference axis, means for receiving pulses reflected from a target, and an antenna common to the transmit and receive means, means to determine the line-of-sight to a target with respect to a reference axis comprising:

(a) AGC means to keep substantially constant the amplitude of the output of the receiving means;

(b) means to derive from said AGC means an AGC modulation signal varying sinusoidally with the spin rate of the antenna, whereby the phase of the AGC signal is indicative of the position of the antenna with respect to the reference axis, the AGC modulation signal having an instantaneous minimum value when the antenna is pointed closest to the target; and (c) gating means responsive to the amplitude and phase of said AGC signal to provide a periodic output signal which is modulated in duration in accordance with the amplitude of said AGC signal and which occurs in time in accordance with the phase of said AGC signal.

5. In a conical or spiral scan radar system including means for transmitting pulsed electromagnetic energy in a predetermined pattern about a reference axis, means for receiving pulses reflected from a target, and an antenna common to the transmit and receive means, means to determine the line-of-sight to a target with respect to a reference axis comprising:

(a) AGC means to keep substantially constant the amplitude of the output of the receiving means;

(b) means to derive from said AGC means an AGC modulation signal varying sinusoidally with the spin rate of the antenna, whereby the phase of the AGC signal is indicative of the position of the antenna with respect to the reference axis, the AGC modulation signal having an instantaneous minimum value when the antenna is pointed closest to the target;

(c) detector means for deriving a D.-C. signal which is proportional to the amplitude of said AGC signal; and (d) gating means responsive to said sinusoidal AGC signal and said D.-C. signal for providing a periodic output signal which is modulated in duration and occurrence through the variable cut-off of said AGC signal.

6. In an airborne spiral scan radar, including means for transmitting pulsed electromagnetic energy, means for receiving pulses reflected from an airborne target, and an antenna common to the transmit and receive means, means to determine the line-of-sight to an airborne target with respect to a reference axis comprising AGC means to keep substantially constant the amplitude of the output of the receiving means, means to derive from said AGC means an AGC modulation signal varying sinusoidally with the rate of scan of the antenna, whereby the phase of the AGC modulation signal is indicative of the position of the antenna with respect to the reference axis, the AGC modulation signal varying in amplitude and having minimum values when the antenna is pointing closest to the target, means to derive a signal indicative of the deviation of the axis of scan of the antenna from the reference axis, an AGC signal amplitude normalizer, means for applying the deviation signal and the AGC modulation signal to said normalizer to obtain a constant value AGC modulation signal, a controlled circuit, the normalized AGC modulation signal being applied to said controlled circuit, said controlled circuit having an output dependent on the magnitude of the normalized AGC modulation signal, and target position indicating means, the output of said controlled circuit being applied to said target position indicating means to obtain an indication of the position of the target with respect to the reference axis.

7. In an airborne spiral scan radar, including means for transmitting pulsed electromagnetic energy, means for receiving pulses reflected from an airborne target, and an antenna common to the transmit and received means, means to determine the line-of-sight to an airborne target with respect to a reference axis comprising AGC means to keep substantially constant the amplitude of the output of the receiving means, means to derive from said AGC means an AGC modulation signal varying sinusoidally with the rate of scan of the antenna, whereby the phase of the AGC signal is indicative of the position of the antenna with respect to the reference axis, the AGC signal varying in amplitude and having minimum values when the antenna is pointing closest to the target, means to derive a signal indicative of the deviation of the axis of scan of the antenna from the reference axis, an AGC signal amplitude normalizer, means for applying the deviation signal and the AGC modulation signal to said normalizer to obtain a constant value AGC modulation signal, means for amplifying the output of the receiver, the normalized AGC modulation signal being applied to said amplifying means, said amplifying means being responsive to and gated by the normalized AGC modulation signal, and target position indicating means, the output of said amplifying means being applied to said target position indicating means to obtain an indication of the position of the target with respect to the reference axis.

8. In an airborne spiral scan radar, including means for transmitting pulsed electromagnetic energy, means for receiving pulses reflected from an airborne target, and an antenna common to the transmit and receive means, means to determine the line-of-sight to an airborne target with respect to a reference axis comprising AGC means to keep substantially constant the amplitude of the output of the receiving means, means to derive from said AGC means an AGC modulation signal varying sinusoidally with the rate of scan of the antenna, whereby the phase of the AGC signal is indicative of the position of the antenna with respect to the reference axis, the AGC signal varying in amplitude and having minimum values when the antenna is pointing closest to the target, means to derive a signal indicative of the deviation of the axis of scan of the antenna from the reference axis, an AGC signal amplitude normalizer, means for applying the deviation signal and the AGC signal to said normalizer to obtain a constant value AGC modulation signal, means for amplifying the output of the receiver, the normalized AGC modulation signal being applied to said amplifying means, said amplifying means being responsive to and gated by the normalized AC signal, a cathode ray tube of the radial sweep type having its sweep rate synchronized with the rate of scan of the antenna, the output of said amplifying means being applied to said cathode ray tube to obtain an indication of the position of the target with respect to the reference axis.

References Cited in the file of this patent

UNITED STATES PATENTS

| | | |
|---|---|---|
| 2,423,519 | Rhea et al. | July 8, 1947 |
| 2,546,730 | Ostendorf et al. | Mar. 27, 1951 |
| 2,552,527 | Dean et al. | May 15, 1951 |
| 2,743,355 | Sink | Apr. 24, 1956 |